C. A. BORK.
HAY RACK.
APPLICATION FILED MAY 4, 1918.

1,279,236.

Patented Sept. 17, 1918.

Witnesses
J. M. Jester

Inventor
C. A. Bork
By Victor J. Evans
Attorney

UNITED STATES PATENT OFFICE.

CHARLEY A. BORK, OF PAYNESVILLE, MINNESOTA.

HAY-RACK.

1,279,236.   Specification of Letters Patent.   Patented Sept. 17, 1918.

Application filed May 4, 1918. Serial No. 232,554.

*To all whom it may concern:*

Be it known that I, CHARLEY A. BORK, a citizen of the United States, residing at Paynesville, in the county of Stearns and State of Minnesota, have invented new and useful Improvements in Hay - Racks, of which the following is a specification.

This invention relates to agricultural vehicles, particularly to hay racks, and has for its object the provision of novel securing means whereby the cross pieces of a hay rack may be secured upon the longitudinal bars thereof in such a manner that the maximum strength will be attained with a minimum expenditure of time and labor in assembling.

A further object is the provision of securing means of this character which will be extremely simple and inexpensive in manufacture, strong and efficient in securing a bracing action, durable in service and a general improvement of the art.

With these objects and advantages in view the invention consists in the novel construction hereinafter more fully described and claimed, and illustrated in the accompanying drawing in which:—

Figure 1:
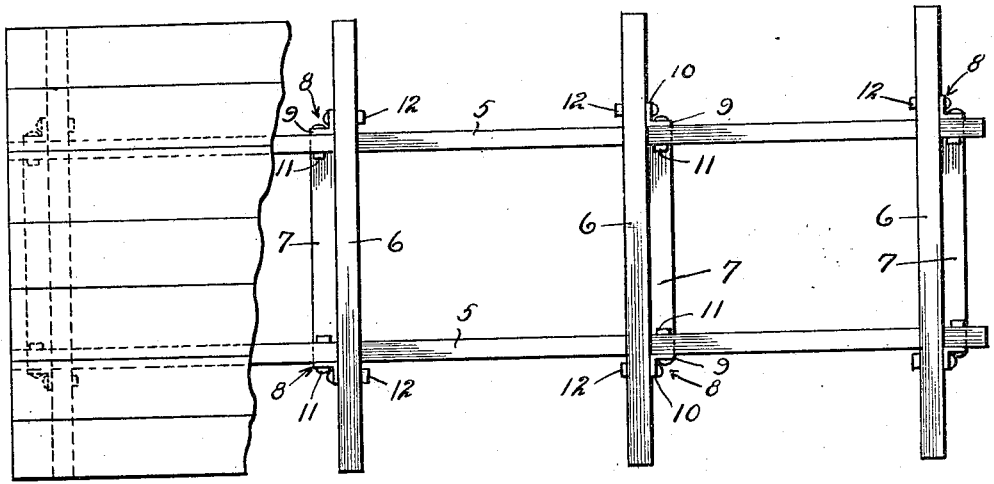
Figure 1 is a plan view of a hay rack constructed in accordance with my invention, part of the floor being broken away.
Figure 2:
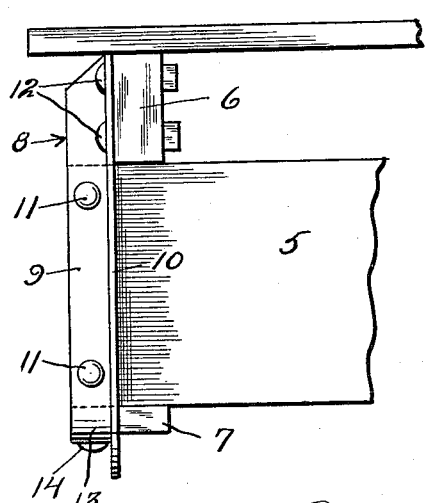
Fig. 2 is a fragmentary side elevation of the same.
Figure 3:
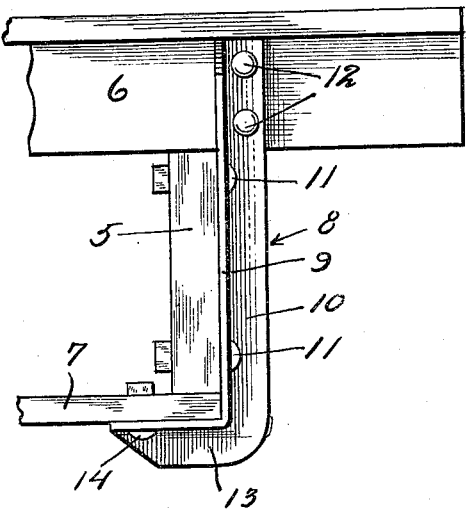
Fig. 3 is a fragmentary end elevation.

Referring more particularly to the drawing the numeral 5 designates the longitudinal bars of the hay rack upon which are disposed at intervals the upper cross bars 6, and upon the undersides of which are disposed the lower cross bars 7. Heretofore it has been a common practice to secure these cross bars in position by means of substantially U-shaped clips secured thereto. A disadvantage of this structure has been that the U-shaped clips have frequently become twisted so that they do not hold the cross bars firmly in position.

In carrying out my invention I provide at the juncture of the cross bars with the longitudinal bars, securing members 8, arranged as shown. Each securing member is formed of angle iron and includes right angularly extending plates 9 and 10. The lower portion of each plate 9 is provided with spaced holes for the reception of bolts 11 passing through the bar 5 and the upper portion of each plate 10 is provided with spaced holes for the reception of bolts 12 passing through the bar 6. The lower end of each member 8 is bent as shown at 13 to extend beneath the lower cross bar 7 to which it is bolted as at 14.

From the foregoing description and a study of the drawing it will be apparent that I have thus provided a securing device for fastening the cross bars of a hay rack upon the longitudinal bars thereof in an extremely simple manner without the use of special tools and without the necessity for any great degree of skill, and which will be thoroughly efficient in use and strong and durable in service.

Having thus described my invention I claim:

Securing means for fastening the upper and lower cross bars of a hay rack upon the longitudinal bars thereof, comprising a vertically disposed angle bar member arranged at the juncture of each of the upper and lower cross bars with each longitudinal bar and including right-angularly extending flanges, the lower portion of one flange bearing against the longitudinal bar and provided with holes for the reception of securing bolts and the upper portion of the other flange bearing against the upper cross bar and being provided with holes for the passage of securing bolts, the lower ends of said members being bent to extend horizontally beneath the lower cross bars and having said first named flanges secured thereto, the lower ends of said members terminating at points spaced inwardly from the longitudinal bars.

In testimony whereof I affix my signature.

CHARLEY A. BORK.

Copies of this patent may be obtained for five cents each, by addressing the "Commissioner of Patents, Washington, D. C."